United States Patent
Izumi et al.

(10) Patent No.: US 10,141,802 B2
(45) Date of Patent: Nov. 27, 2018

(54) ROTOR OF ELECTRIC MOTOR FOR COMPRESSOR

(71) Applicant: FUJITSU GENERAL LIMITED, Kanagawa (JP)

(72) Inventors: Yasuyuki Izumi, Kanagawa (JP); Taku Morishita, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 175 days.

(21) Appl. No.: 15/121,983

(22) PCT Filed: Feb. 3, 2015

(86) PCT No.: PCT/JP2015/053005
§ 371 (c)(1),
(2) Date: Aug. 26, 2016

(87) PCT Pub. No.: WO2015/141307
PCT Pub. Date: Sep. 24, 2015

(65) Prior Publication Data
US 2017/0077772 A1   Mar. 16, 2017

(30) Foreign Application Priority Data
Mar. 20, 2014 (JP) .................. 2014-058914

(51) Int. Cl.
*H02K 7/04* (2006.01)
*H02K 1/27* (2006.01)
(Continued)

(52) U.S. Cl.
CPC ........... *H02K 1/276* (2013.01); *H02K 5/10* (2013.01); *H02K 7/04* (2013.01); *F04C 18/0215* (2013.01);
(Continued)

(58) Field of Classification Search
CPC ................... H02K 1/276; H02K 7/04
See application file for complete search history.

(56) References Cited

U.S. PATENT DOCUMENTS 6,799,362 B2 * 10/2004 Murakami ............ H02K 1/276
                                                            29/598
9,385,573 B2   7/2016 Morozumi
(Continued)

FOREIGN PATENT DOCUMENTS

CN   1881753 A   12/2006
CN   2881019 Y    3/2007
(Continued)

OTHER PUBLICATIONS

Extended European Search Report issued in corresponding EP Patent Application No. 15765670.3, dated Sep. 19, 2017.
(Continued)

*Primary Examiner* — Dang Le
(74) *Attorney, Agent, or Firm* — McDermott Will & Emery LLP

(57) ABSTRACT

At least three axis direction through-holes arranged at equal intervals in the circumferential direction are provided in a rotor laminated steel plate and a rotor end plate. The rotor laminated steel plate and the rotor end plate are fixed with three rivets for passing through the axis direction through-holes. A balance weight formed of one laminated metal plate is fixed to the one rotor end plate with two rivets of the three rivets. A balance weight formed of the other laminated metal plate is integrated by caulking and has a projection formed thereon and fixed to the other rotor end plate with the remaining single rivet. The projection is engaged with a recess or a through-hole provided in the other rotor end plate so that the balance weight is positioned to the other rotor end plate.

3 Claims, 5 Drawing Sheets

(51) Int. Cl.
*H02K 5/10* (2006.01)
*F04C 18/02* (2006.01)
*F04C 29/00* (2006.01)

(52) U.S. Cl.
CPC ...... *F04C 29/0085* (2013.01); *F04C 2240/40* (2013.01)

(56) References Cited

U.S. PATENT DOCUMENTS

| | | |
|---|---|---|
| 2003/0230948 A1 | 12/2003 | Murakami et al. |
| 2008/0211340 A1 | 9/2008 | Lee et al. |
| 2012/0098359 A1* | 4/2012 | Morozumi ............... H02K 7/04 310/51 |

FOREIGN PATENT DOCUMENTS

| | | |
|---|---|---|
| CN | 201813251 U | 4/2011 |
| CN | 102356237 A | 2/2012 |
| CN | 102362417 A | 2/2012 |
| EP | 1 246 348 A2 | 10/2002 |
| EP | 1 330 010 A1 | 7/2003 |
| EP | 2 416 472 A1 | 2/2012 |
| JP | 63-28250 A | 2/1988 |
| JP | 2-26370 U | 2/1990 |
| JP | 4-185247 A | 7/1992 |
| JP | 4-237891 A | 8/1992 |
| JP | 5-146102 A | 6/1993 |
| JP | 9-112471 A | 5/1997 |
| JP | 2000-116080 A | 4/2000 |
| JP | 2010-239813 A | 10/2010 |

OTHER PUBLICATIONS

Office Action issued in corresponding Chinese Patent Application No. 201580008659.4, dated Dec. 1, 2017.
Decision to Grant issued in corresponding Japanese Application No. 2014-058914, dated Nov. 10, 2015.
Search Report issued in International Application No. PCT/JP2015/053005, dated Apr. 28, 2015.

* cited by examiner

ROTOR OF ELECTRIC MOTOR FOR COMPRESSOR

CROSS REFERENCE

This application is the U.S. National Phase under 35 US.C. § 371 of International Application No. PCT/JP2015/053005, filed on Feb. 3, 2015, which claims the benefit of Japanese Application No. 2014-058914, filed on Mar. 20, 2014, the entire contents of each are hereby incorporated by reference.

TECHNICAL FIELD

The present invention relates to a rotor of an electric motor for a compressor used for a rotating compressor such as a rotary compressor and a scroll compressor.

BACKGROUND ART

Conventionally, there is disclosed an electric compressor (for example, refer to Patent Document 1) that includes a motor and a compression element provided in a hermetic casing, and a balance weight is provided at the end of a rotor of the motor. In the electric compressor, the balance weight is formed by laminating a plurality of balance weight plates formed of a circular thin plate, and a plurality of balance adjusting units that is surrounded by a continuous slit and can be cut off is formed on the balance weight plate.

Also, conventionally, there is disclosed a hermetic rotary compressor (for example, refer to Patent Document 2) that includes a motor element and a compression element housed in a sealed container, and a balance weight is fixed to an end ring of a rotor of the motor element. In the hermetic rotary compressor, the balance weight is divided into a single first balance weight and a second balance weight formed of a single or a plurality of thin plates in the axis direction.

CITATION LIST

Patent Citation

Patent Document 1: Japanese Laid-open Patent Publication No. 04-237891
Patent Document 2: Japanese Laid-open Patent Publication No. 09-112471

SUMMARY OF INVENTION

Technical Problem

It is requested to attach the two balance weights on the both side surfaces of the rotor of the conventional electric motor for a compressor disclosed in Patent Documents 1 and 2 at positions having phases 180° different from each other (refer to FIG. 2) in consideration of the balance at the time of rotation. Here, when a six-pole rotor is fixed with three rivets 26a, 26b, and 26c arranged at phase differences of 120° and the two balance weights (formed by laminating a plurality of balance weight plates formed of circular thin plates) 20 and 22 are fixed with the three rivets 26a, 26b, and 26c, the one balance weight 20 can be fixed with the two rivets 26a and 26b. However, it is requested to fix the other balance weight 22 with the single rivet 26c.

However, in this case, when the balance weight is fixed with the rivet 26c, each balance weight plate of the balance weight 22 is individually rotated around the single rivet 26c, and the position of the balance weight 22 cannot be stable.

The present invention has been made in consideration of the above. A purpose of the present invention is to obtain a rotor of an electric motor for a compressor which can integrate and stably position balance weight plates.

Solution to Problem

To solve the above mentioned problem and attain the purpose, the present invention is characterized in that a rotor of an electric motor for a compressor includes: a rotor laminated steel plate; a permanent magnet configured to be provided in the rotor laminated steel plate and to be arranged to form a plurality of magnetic poles in a circumferential direction around a rotation axis; rotor end plates configured to be provided on both end surfaces of the rotor laminated steel plate and to restrict movement of the permanent magnet in the axis direction; and balance weights configured to be formed of laminated metal plates respectively fixed to outer surfaces of the rotor end plates, wherein at least three axis direction through-holes arranged at equal angle intervals in the circumferential direction are provided in the rotor laminated steel plate and the rotor end plates, the rotor laminated steel plate and the rotor end plates are fixed with three rivets for passing through the axis direction through-holes, one of the balance weights formed of one laminated metal plate is fixed to one of the rotor end plates with the two rivets of the three rivets, a projection is formed on the other balance weight formed of the other laminated metal plate which is integrated by caulking, and the other balance weight is fixed to the other rotor end plate with the remaining single rivet, and the projection is engaged with a recess or a through-hole provided in the other rotor end plate so that the balance weight is positioned to the other rotor end plate.

Advantageous Effects of Invention

According to the present invention, when the balance weight formed of the laminated metal plate is fixed to the rotor with a single rivet, the balance weight can be stably positioned to the rotor. In addition, the respective laminated metal plates of the balance weights can be prevented from individually rotating around the rivet during the rotation drive of the rotor by the positioning by the engagement of a projection of the balance weight formed by caulking with a recess or a through-hole provided in the rotor end plate.

EMBODIMENTS FOR CARRYING OUT THE INVENTION

A case of a six-pole rotor is described in detail below with reference to the drawings as an example of an embodiment of a rotor of an electric motor for a compressor according to the present invention. The present invention is not limited to the embodiment.

Embodiment

Figure 1:
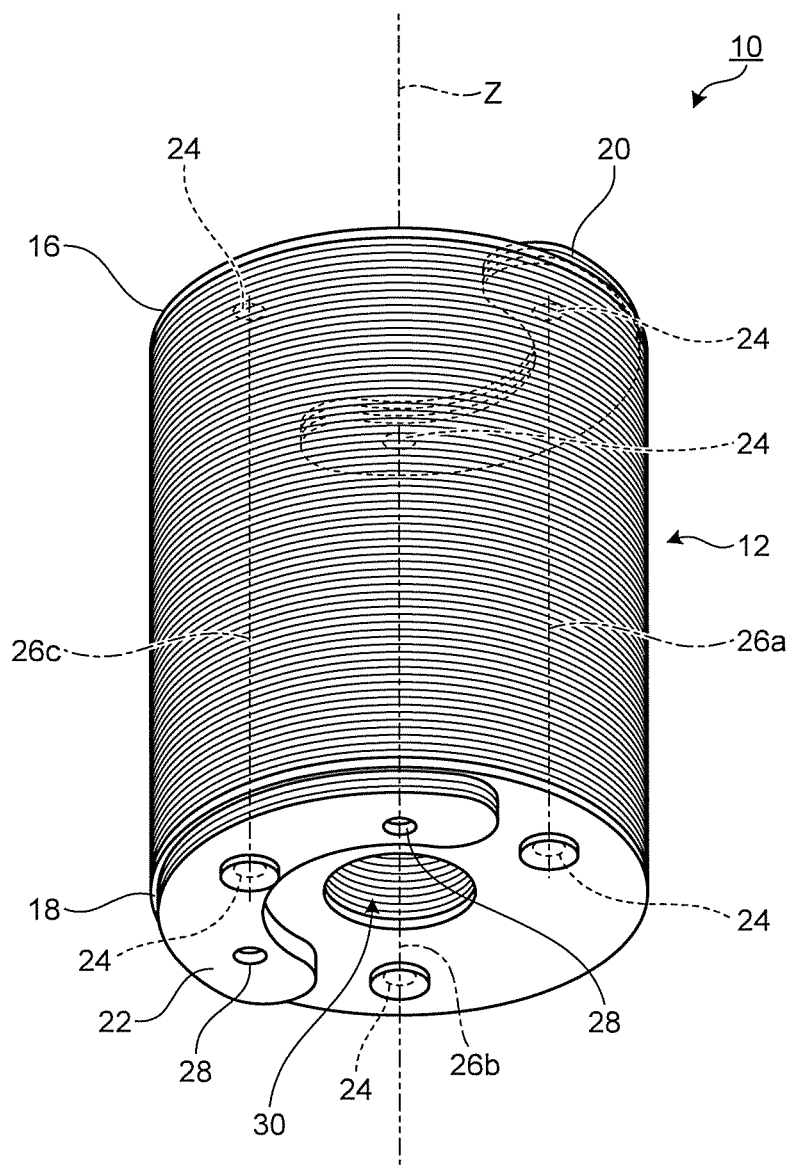
FIG. 1 is a perspective diagram of an embodiment of a rotor of an electric motor for a compressor according to the present invention.
Figure 2:
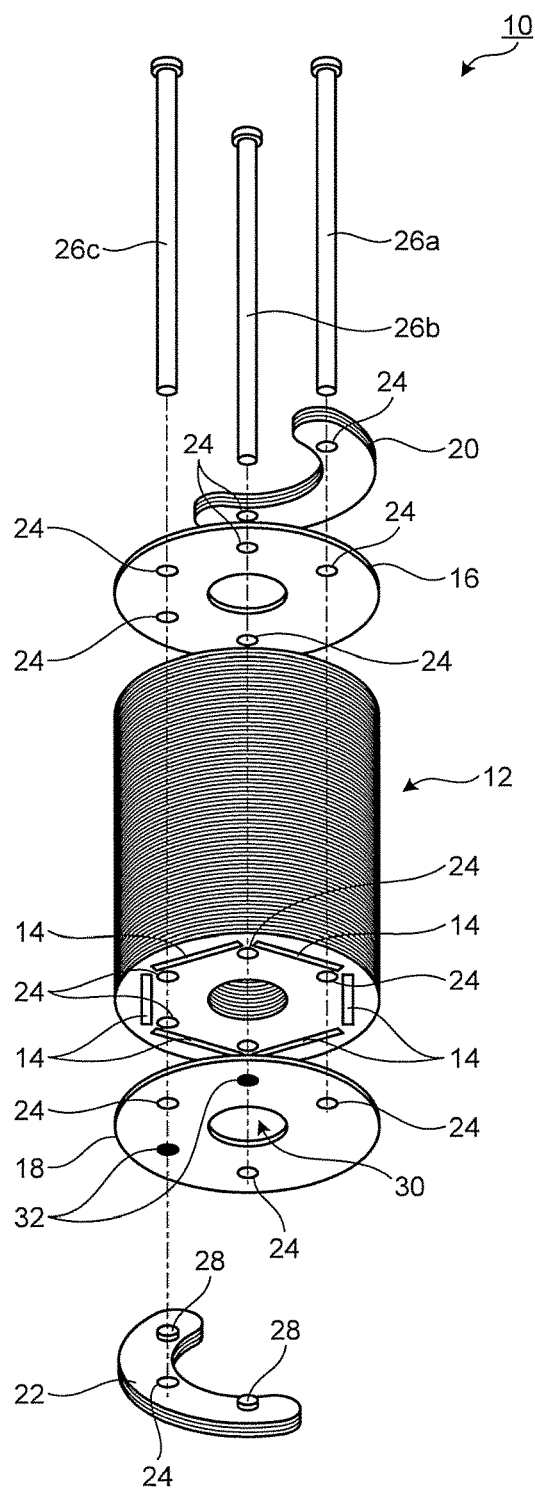
FIG. 2 is a disassembled perspective diagram of the rotor of the electric motor for the compressor according to the embodiment.

As illustrated in FIGS. 1 and 2, a rotor 10 of an electric motor for a compressor according to the present invention is a rotor for an electric motor for a compressor. The rotor 10 includes a columnar rotor laminated steel plate 12 having a shaft hole 30 and a permanent magnet 14. The permanent magnet 14 is provided in the rotor laminated steel plate 12 and has an N pole and an S pole alternately arranged to configure six poles in a circumferential direction around the rotation axis Z (rotor 10 according to the embodiment is a six-pole rotor).

Also, the rotor 10 includes disk-shaped rotor end plates 16 and 18 which are coaxially provided on both side surfaces of the rotor laminated steel plate 12 and restrict the movement of the permanent magnet 14 in an axis direction and arc-shaped plate-like balance weights 20 and 22 respectively provided on outer surfaces of the rotor end plates 16 and 18. The balance weights 20 and 22 cancel a centrifugal force for acting on an eccentrically rotating part of a compression mechanism which is not illustrated and maintain a balance of the entire compressor. The balance weights 20 and 22 are provided around the rotation axis Z at positions having phases 180° different from each other.

Three axis direction through-holes 24, which are arranged with equal intervals in the circumferential direction (120° interval in circumferential direction), are provided in the rotor laminated steel plate 12 and the rotor end plates 16 and 18. Here, the axis direction through-hole 24 is provided at a position as avoiding the permanent magnet 14. Also, it is preferable that the number of axis direction through-holes 24 be three. As illustrated in FIG. 2, five axis direction through-holes 24 may be arranged.

The rotor laminated steel plate 12 and the rotor end plates 16 and 18 are fixed with three rivets 26a, 26b, and 26c for respectively passing through axis direction through-holes 24.

One balance weight 20 is formed of a laminated metal plate in which a plurality of thin metal plates is laminated and fixed to the one rotor end plate 16 with two rivets 26a and 26b of the three rivets. The balance weight 20 formed of the laminated metal plate may be integrated by caulking. However, it is not necessary for the balance weight 20 to be integrated since the balance weight 20 is positioned and fixed with the two rivets 26a and 26b.

Figure 3:
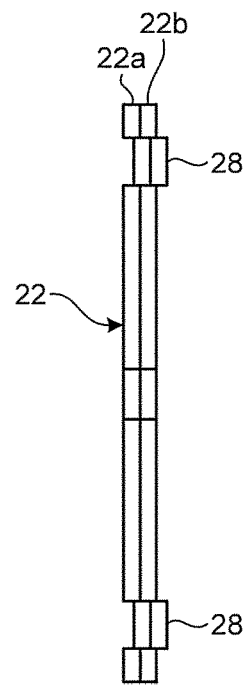
FIG. 3 is a cross-sectional diagram of a balance weight according to the embodiment.
Figure 4:
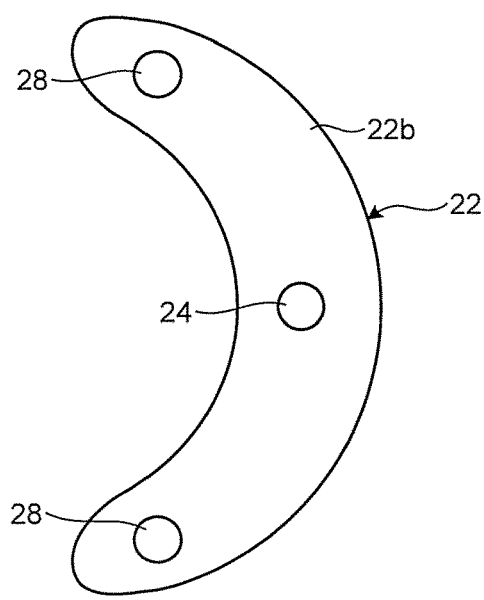
FIG. 4 is a plan view of the balance weight according to the embodiment.
Figure 5:
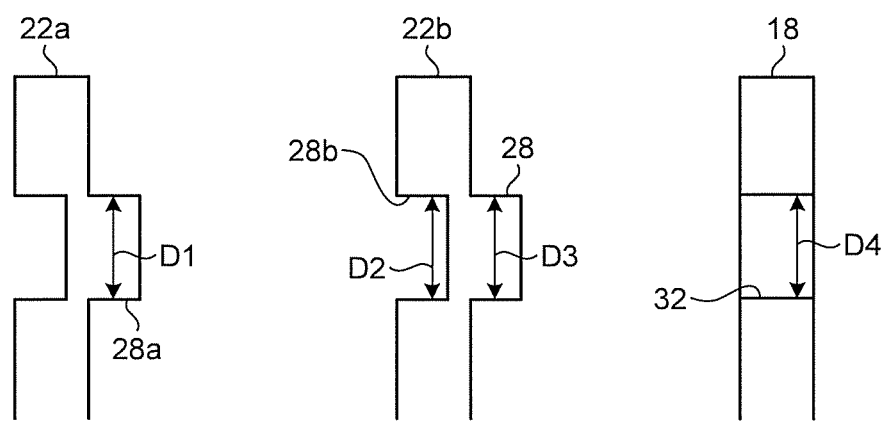
FIG. 5 is a disassembled cross-sectional diagram of the balance weight according to the embodiment.

As illustrated in FIGS. 3 and 4, the other balance weight 22 is formed of a laminated metal plate in which thin metal plates 22a and 22b are laminated. The balance weight 22 is integrated by being caulked at two positions on the end sides. Projections 28 are formed at the two positions on the end sides by the caulking. As illustrated in FIG. 5, a dimensional relation between an outer diameter D1 of the projection 28a of the thin metal plate 22a formed by the caulking and an inner diameter D2 of a recess 28b of the thin metal plate 22b formed by inserting the projection 28a is D1=D2. The plurality of thin metal plates 22a and 22b is integrated by press-fitting the projection 28a into the recess 28b. The numbers of laminated thin metal plates 22a and 22b of the balance weights 20 and 22 are adjusted according to an unbalance amount of a compression mechanism 40 to be described below. Also, it is preferable that the materials of the balance weights 20 and 22 be nonmagnetic materials so as not to influence on characteristics of an electric motor 42 to be described below.

Also, the recesses 32 are formed at two positions on the other rotor end plate 18 opposed to the projections 28. Here, the recess 32 may be a through-hole for passing through the rotor end plate 18 and may be formed by press molding and the like. It is preferable that the dimensional relation between the outer diameter D3 of the projection 28 of the thin metal plate 22b and the inner diameter D4 of the recess 32 of the rotor end plate 18 be D3<D4 so that the projection 28 is easily engaged with the recess 32.

The other balance weight 22 is fixed to the other rotor end plate 18 with the remaining single rivet 26c and is positioned relative to the other rotor end plate 18 by engaging the projection 28 with the recess 32.

In this way, the projection 28 is formed on the other balance weight 22 by the caulking, and the recess 32 is provided in the rotor end plate 18, and then, the projection 28 is engaged with the recess 32. Accordingly, the other balance weight 22 can be positioned relative to the rotor end plate 18, and the balance weight 22 does not rotate around the rivet 26c. Therefore, when the balance weight 22 is fixed to the rotor 10 with the single rivet 26c, the balance weight 22 can be stably positioned to the rotor 10 without using a jig for positioning and the like. In addition, the balance weight 22 is prevented from rotating around the rivet 26c during the rotation drive of the rotor by the positioning by the engagement of the projection 28 with the recess 32.

Next, a case where the rotor 10 of the electric motor for the compressor according to the present invention is applied to a two-cylinder rotary compressor is described with reference to FIG. 6.

Figure 6:
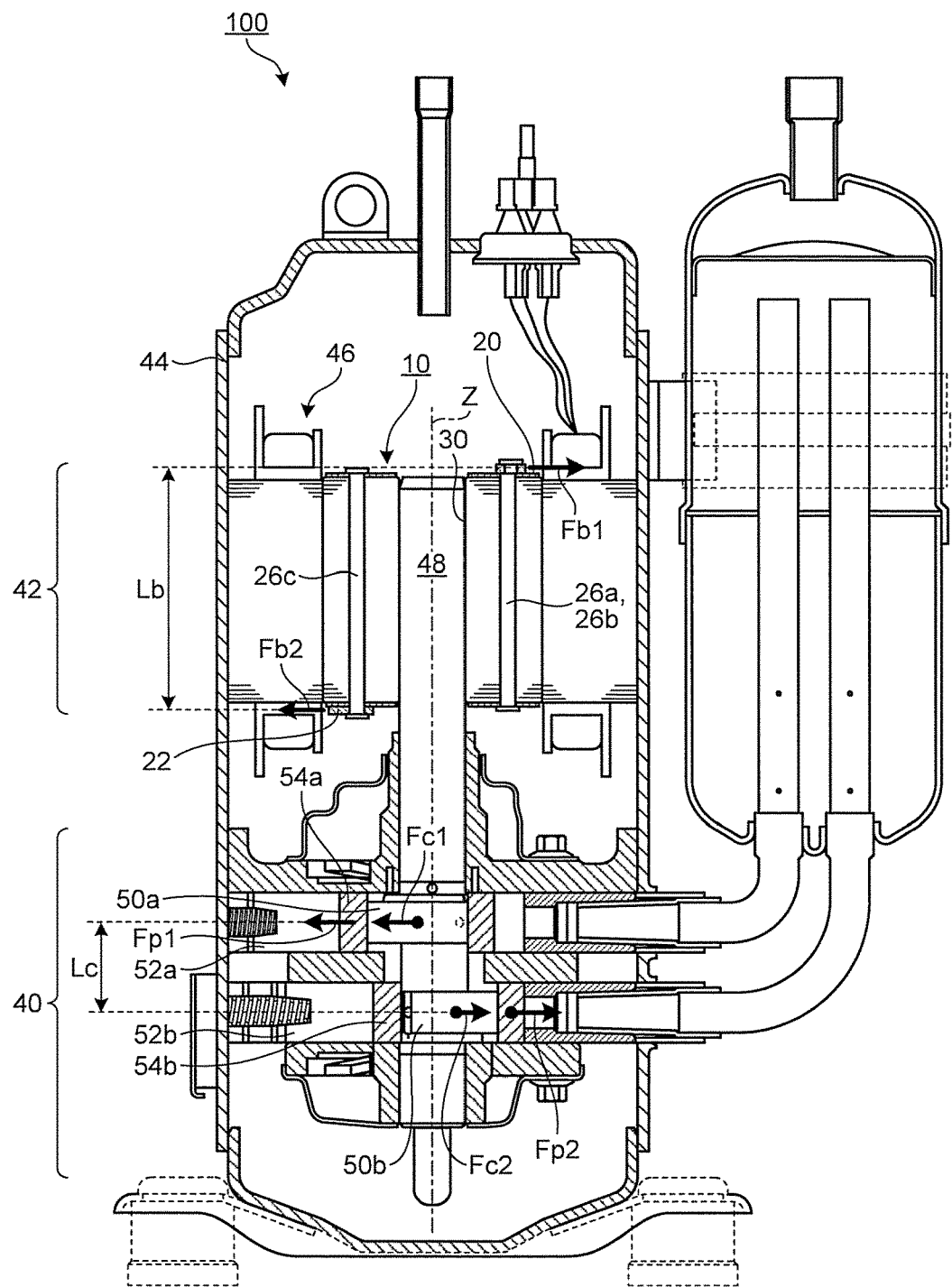
FIG. 6 is a vertical cross-sectional diagram of a compressor for using the rotor of the electric motor for the compressor according to the embodiment.

As illustrated in FIG. 6, a two-cylinder rotary compressor 100 includes the compression mechanism 40 for generating compressed fluid and the electric motor 42 for driving the compression mechanism 40 (electric motor 42 is six-pole electric motor). The electric motor 42 includes a stator 46 fixed in a hermetic casing 44 and the rotor 10 according to the present invention. A shaft 48 extending downward to the compression mechanism 40 is fixed to the shaft hole 30 of the rotor 10. Eccentric cranks 50a and 50b of the compression mechanism 40 are provided on the lower side of the shaft 48.

The compression mechanism 40 includes two cylinders 52a and 52b arranged in upper and lower parts. The eccentric cranks 50a and 50b are respectively arranged in the cylinders 52a and 52b. The eccentric cranks 50a and 50b are respectively engaged with ring-shaped pistons 54a and 54b.

When the shaft 48 of the rotor 10 is rotated by driving the electric motor 42, centrifugal forces Fc1 and Fc2 respectively act on the eccentric cranks 50a and 50b, and centrifugal forces Fp1 and Fp2 respectively act on the pistons 54a and 54b.

On the other hand, centrifugal forces Fb1 and Fb2 respectively act on the balance weights 20 and 22 fixed to the upper and lower parts of the rotor 10 of the electric motor 42.

Here, to ensure the balance of the entire compressor, it is preferable to previously set the positions and masses of the two balance weights 20 and 22 so that the following formulas (1) and (2) are satisfied.

$$(Fc1+Fp1)+Fb2 \approx (Fc2+Fp2)+Fb1 \qquad \text{formula (1)}$$

$$(Fc1+Fp1+Fc2+Fp2) \times Lc \approx (Fb1+Fb2) \times Lb \qquad \text{formula (2)}$$

Here, Lc is a distance between working points of the centrifugal forces Fc1 and Fc2 in the axis direction.

A distance between working points of the centrifugal forces Fp1 and Fp2 in the axis direction is also referred to as Lc.

Lb is a distance between working points of the centrifugal forces Fb1 and Fb2 in the axis direction.

As described above, according to the present invention, the rotor 10 of the electric motor 42 for a compressor includes the rotor laminated steel plate 12, the permanent magnet 14 which is provided in the rotor laminated steel plate 12 and is arranged to form a plurality of magnetic poles in the circumferential direction around the rotation axis, the rotor end plates 16 and 18 which are provided on both end surfaces of the rotor laminated steel plate 12 and restrict the movement of the permanent magnet 14 in the axis direction, and the balance weights 20 and 22 formed of the laminated metal plates respectively fixed to the outer surfaces of the rotor end plates 16 and 18. At least three axis direction through-holes 24 arranged at equal intervals in the circumferential direction are provided in the rotor laminated steel plate 12 and the rotor end plates 16 and 18. The rotor laminated steel plate 12 and the rotor end plates 16 and 18 are fixed with the three rivets 26a, 26b, and 26c for passing through the axis direction through-holes 24. The balance weight 20 formed of the one laminated metal plate is fixed to the one rotor end plate 16 with the two rivets 26a and 26b of the three rivets 26a, 26b, and 26c. The balance weight 22 formed of the other of the thin metal plates 22a and 22b is integrated by caulking and has the projection 28 formed thereon and fixed to the rotor end plate 18 with the remaining single rivet 26c. The projection 28 is engaged with the recess 32 or the through-hole provided in the other rotor end plate 18 so that the balance weight is positioned to the other rotor end plate 18.

Therefore, when the balance weight 22 is fixed to the rotor 10 with the single rivet 26c, the balance weight 22 can be stably positioned to the rotor 10 without using a jig for positioning and the like. In addition, the thin metal plates 22a and 22b of the balance weight 22 is prevented from rotating around the rivet 26c during the rotation drive of the rotor 10 by the positioning by the engagement of the projection 28 of the balance weight 22 formed by the caulking with the recess 32 or the through-hole provided in the rotor end plate 18.

EXPLANATION OF REFERENCE

10 ROTOR (ROTOR OF ELECTRIC MOTOR FOR COMPRESSOR)
12 ROTOR LAMINATED STEEL PLATE
14 PERMANENT MAGNET
16, 18 ROTOR END PLATE
20 BALANCE WEIGHT (ONE BALANCE WEIGHT)
22 BALANCE WEIGHT (THE OTHER BALANCE WEIGHT)
22a, 22b THIN METAL PLATE
24 AXIS DIRECTION THROUGH-HOLE
26a, 26b, 26c RIVET
28 PROJECTION
30 SHAFT HOLE
32 RECESS
40 COMPRESSION MECHANISM
42 ELECTRIC MOTOR
44 HERMETIC CASING
46 STATOR
48 SHAFT
50a, 50b ECCENTRIC CRANK
52a, 52b CYLINDER
54a, 54b PISTON
100 COMPRESSOR

The invention claimed is:

1. A rotor of an electric motor for a compressor comprising:
a rotor laminated steel plate;
a permanent magnet configured to be provided in the rotor laminated steel plate and to be arranged to form a plurality of magnetic poles in a circumferential direction around a rotation axis;
rotor end plates configured to be provided on both end surfaces of the rotor laminated steel plate and to restrict movement of the permanent magnet in an axis direction; and balance weights configured to be formed of laminated metal plates respectively fixed to outer surfaces of the rotor end plates, wherein
at least three axis direction through-holes arranged at equal angle intervals in the circumferential direction are provided in the rotor laminated steel plate and the rotor end plates,
the rotor laminated steel plate and the rotor end plates are fixed with three rivets for passing through the axis direction through-holes,
one of the balance weights formed of one laminated metal plate is fixed to one of the rotor end plates with the two rivets of the three rivets,
a projection having an outer diameter D3 is formed on the other balance weight formed of the other laminated metal plate which is integrated by caulking, and the other balance weight is fixed to the other rotor end plate with the remaining single rivet, and
the projection is engaged with a recess or a through-hole, the recess or the through-hole being provided in the other rotor end plate and having an inner diameter D4 greater than the outer diameter D3 of the projection, so that the balance weight is positioned to the other rotor end plate.

2. The rotor of an electric motor for a compressor according to claim 1, wherein the electric motor is a six-pole electric motor.

3. The rotor of an electric motor for a compressor according to claim 1, wherein a material of the balance weight is a nonmagnetic material.

* * * * *